United States Patent [19]

Chang et al.

[11] Patent Number: 4,894,265
[45] Date of Patent: Jan. 16, 1990

[54] BUBBLE-TYPE CUSHIONING AND PACKAGING SHEET AND METHOD OF MANUFACTURE

[75] Inventors: Ted B. Chang, San Francisco; Arthur Graham, Portola Valley, both of Calif.

[73] Assignee: Free-Flow Packaging Corporation, Redwood City, Calif.

[21] Appl. No.: 144,529

[22] Filed: Jan. 15, 1988

[51] Int. Cl.$^4$ .............................................. B32B 3/12
[52] U.S. Cl. ................................. 428/34.6; 428/34.9; 428/35.7; 428/178; 428/184; 428/516; 206/461; 206/593; 156/145; 156/146
[58] Field of Search ................ 156/145, 146; 206/461, 206/593; 428/35, 178, 184, 516, 34.6, 34.9, 35.7, 35.9

[56] References Cited

U.S. PATENT DOCUMENTS

| | | | |
|---|---|---|---|
| 3,616,158 | 10/1971 | Rubens | 206/593 |
| 3,756,884 | 9/1973 | Hagino | 156/145 |
| 3,817,803 | 6/1974 | Horsky | 156/145 |
| 4,576,844 | 3/1986 | Murray et al. | 428/516 |
| 4,680,207 | 7/1987 | Murray | 428/35 |
| 4,681,781 | 7/1987 | Murray et al. | 428/35 |

Primary Examiner—Ellis P. Robinson
Assistant Examiner—P. J. Ryan
Attorney, Agent, or Firm—Flehr, Hohbach, Test, Albritton & Herbert

[57] ABSTRACT

Bubble-type flexible cushioning and packaging sheets are formed using films which are composites of single extrusion or multiple extrusion polyethylene films having density, molecular weight and, optionally, additives selected to provide a desired combination of qualities including heat sealability and low gas/vapor transmission. A preferred film material has a cross-sectional profile consisting of an inner region of linear low density polyethylene material surrounded by outer regions of high molecular weight medium density polyethylene material. The material permits the formation of preferred, square bubble configurations using a process which involves sealing two such films along generally parallel longitudinal lines; inflating the films between the longitudinal sealing lines; then sealing the films along transverse lines to form inflated rectangular pockets or bubbles therebetween.

11 Claims, 1 Drawing Sheet

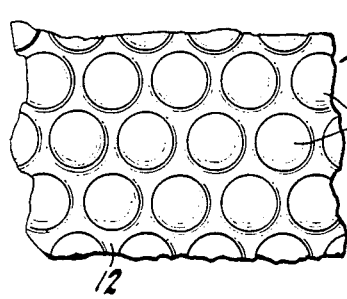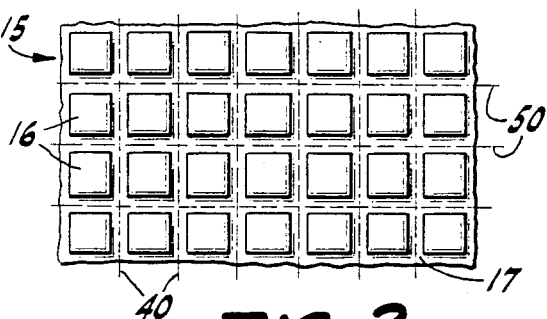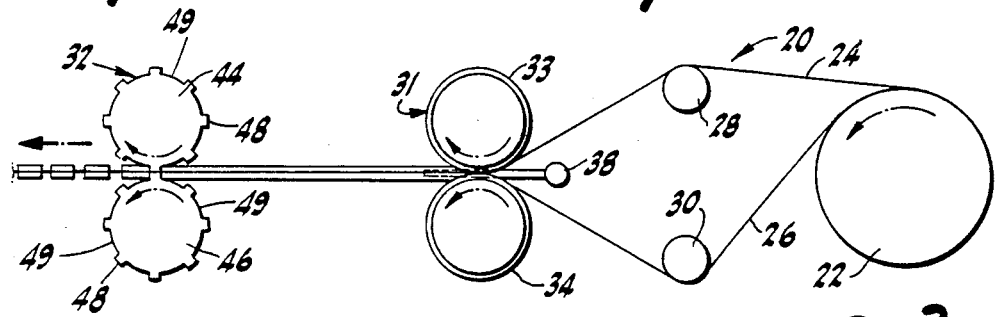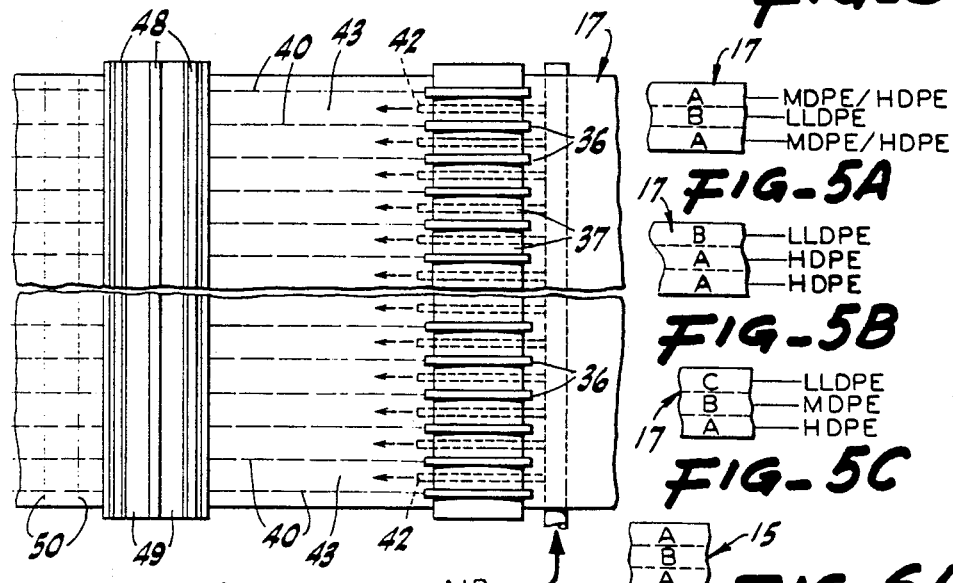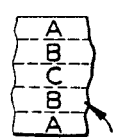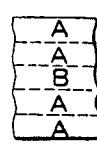

BUBBLE-TYPE CUSHIONING AND PACKAGING SHEET AND METHOD OF MANUFACTURE

BACKGROUND OF THE INVENTION

The present invention relates to bubble-type flexible cushioning and packaging sheets, to methods of manufacturing such sheets and to the material used in the sheets.

BRIEF DESCRIPTION OF THE STATE OF THE ART

1. Required Characteristics of Bubble Cushion Materials

The ease of manufacture and the resulting qualities of bubble-type cushioning and packaging sheet material are dependent to a large extent upon the presence of several critical properties in the film materials which constitute the bubble sheet: sealability, puncture and tear resistance, flexibility, stretchability, and low oxygen and moisture vapor transmission rates. As used here, sealability refers to heat sealing characteristics. Good sealability implies good sealing characteristics at temperatures which are low and, thus, do not degrade the material. The term also implies that heat sealing can be done over a broad temperature range, so that very stringent process temperature controls are not required. The desirability of puncture and tear resistance as well as stretchability is self-evident. Flexibility implies a compromise between limpness at one extreme and rigidity at the other, and is a necessary quality for formability and ease of handling and folding. Finally, low gas transmission is vital (along with sealability and puncture and tear resistance) for retaining cushioning air within the bubbles.

The materials which are used in forming bubble cushioning and packaging sheets include low density polyethylene polymer (also called LDPE), medium density polyethylene (MDPE), high density polyethylene (HDPE) and linear low density polyethylene (LLDPE).

Low density polyethylene has excellent sealing characteristics and has high clarity, which is desirable in packaging applications, but is somewhat tacky to the touch. In addition, it is limp and soft, i.e., without sufficient rigidity. It is a very poor gas barrier, meaning it has very high oxygen and vapor transmission rates.

High density polyethylene has excellent rigidity, has very strong resistance to puncturing and tearing, and is a very good gas barrier. In addition, it is not tacky. However, it is somewhat crinkly to the ear when handled and has very little clarity. More importantly, it has very poor heat sealing characteristics: heat sealing can only be done over a critical narrow band of high temperatures (approximately 125° C. to 132° C.) and it is difficult to obtain good, permanent seals.

Medium density polyethylene has properties generally intermediate those of low density and high density.

Linear low density polyethylene was designed to replace conventional low density polyethylene in many applications because of its favorable production economics and performance characteristics. Linear low density polyethylene has the molecular structure of high density polyethylene but exhibits similar characteristics which are similar to those of low density polyethylene. The use of linear low density polyethylene results in either a stronger product at the same gage or an equivalent product at a reduced gage.

2. Industry Use of Round-Bubble Configurations

Referring to FIG. 1, "bubble"-type flexible cushioning and packaging sheet material 10 typically incorporates round bubbles 11, which are circular pockets of air formed between sheets of plastic film 12 such as polyethylene. Round bubble configurations are used in preference to the square bubble configurations 16 shown schematically in FIG. 2 (despite the lesser susceptibility of square bubbles to rupture and the inherently greater cushioning and support which is provided by the greater square bubble area per unit surface area), because round bubbles are easier to form.

In the past, conventional round bubble cushioning sheets were made from one mil thick, low density polyethylene sheet. Despite the excellent seals provided by the LDPE and despite the use of thick films, the longevity of the bubbles suffered because they could be easily burst and because air was relatively easily dissipated from the bubbles over time, especially under pressure.

Over the last four or five years, the wide use of low density polyethylene films has given way to a large extent to the use of linear low density polyethylene films and high density polyethylene films. Because of their strength, toughness, puncture resistance and excellent gas barrier qualities, bags and sheets made of these films can be of much thinner gauge than those employing low density films. For example, one-half mil thick films of linear low density polyethylene or of high density polyethylene provide better strength and vapor barrier characteristics than one mil thick low density polyethylene films. As mentioned above, however, linear low density and high density polyethylene films have poor heating sealing characteristics. Too often, bubble cushioning and packaging sheets formed from these materials have seals containing punctures or gaps that allow air or vapor leakage.

SUMMARY OF THE INVENTION

In view of the above discussion, it is one objective of the present invention to provide a process for forming square bubble cushioning and packaging sheets.

It is another object to provide a process and a material which together result in a readily formed bubble-type flexible cushioning and packaging sheet material characterized by the desirable qualities of puncture and seal resistance, flexibility, stretchability, and low oxygen and moisture vapor transmission.

In one aspect, our invention which satisfies the above and other objectives is incorporated in a thermal sealing process for forming a rectangular flexible bubble cushioning sheet which uses flexible plastic films having a selected cross-sectional profile of single or multiple extrusion polyethylene material comprising a selected combination of density and molecular weight, alone or in combination with additives which enhance sealability. The associated process involves providing a pair of such films; passing the two films together through a first pair of rotating rollers having transverse mating heating lands thereon for sealing the films together along longitudinal sealing lines, while injecting gas longitudinally to inflate the films between the longitudinal sealing lines; and then passing the longitudinally joined films between a second pair of rotating rollers having longitudinal mating heating lands for sealing the films together along sealing lines transverse to the longitudinal sealing lines, thereby forming a grid of rectangular sealing lines defining sealed inflated regions therebetween.

In another aspect, our invention relates to a flexible cushioning sheet of the type comprising at least a pair of thin films selectively joined together to define sealed gas pockets therebetween. Specially, our invention relates to the improvement in which the gas pockets or bubbles are generally rectangular and each film comprises a polyethylene material having a selected cross-sectional profile of single or multiple extrusion material comprising a selected combination of density and molecular weight, alone or in combination with additives which enhance sealability.

Preferably, the film used in the above process and in the above cushioning sheet is a tri-extrusion material. In a presently preferred embodiment, the tri-extrusion film has an outer-middle-outer thickness cross-section profile of the type ABA, where the outer film regions A are selected from high density polyethylene and high molecular weight medium density polyethylene, and the inner/middle film region B is linear low density polyethylene. That is, the preferred ABA film configuration comprises an inner region of linear low density polyethylene surrounded by outer regions of high molecular weight medium density polyethylene or an inner region of linear low density polyethylene surrounded by outer regions of high density polyethylene. The cushioning sheet formed by joining the two tri-extrusion films has the thickness cross-sectional profile ABA:ABA. Please note, the inner/facing A regions are joined or fused by the heat sealing process so that the joined profile is ABABA.

Alternatively, the tri-extrusion film can be of the type AAB, where A is high density polyethylene, B is linear low density polyethylene and the sheet is joined with the linear low density regions of the two films at the inside to facilitate sealing. The resulting sheet structure is AAB:BAA and, specifically, the joined structure is AABAA.

The tri-extrusion film can also be of the type ABC, where A is high density polyethylene, B is medium density polyethylene and C is linear low density polyethylene. Preferably, the sheet is joined at the linear low density regions to promote sealing. The resulting sheet structure is ABC:CBA and the joined structure is ABCBA.

BRIEF DESCRIPTION OF THE DRAWING

The above and other aspects of our invention are described with respect to the drawings, in which:

FIG. 1 schematically depicts prior art round bubble cushioning and packaging material;

FIG. 2 schematically depicts square bubble cushioning and packaging material formed in accordance with the present invention;

FIG. 3 schematically depicts the prior art heat sealing machine used in manufacturing the square bubble cushioning and packaging material shown in FIG. 2;

FIG. 4 schematically depicts the two heat sealing stations used in the machine and process of FIG. 3 and the sealed configuration which results at each station; and FIGS. 5A–5C schematically depict the preferred tri-extrusion film used in my process and my bubble cushioning material.

FIGS. 6A–6C are cross-sectional view corresponding to the structures of FIGS. 5A–5C taken along lines 6—6 in FIG. 2.

DETAILED DESCRIPTION OF THE PREFERRED EMBODIMENTS

The present invention has evolved from the discovery that the use of a particular class of material in the prior art heat sealing apparatus 20 shown in FIG. 3 provides a unique combination of formability, sealability, low gas transmission, puncture and tear resistance, flexibility and stretchability. In short, the use of the selected material in the apparatus of FIG. 3 provides a unique combination of ease of manufacturing and high quality in a square bubble cushioning and packaging sheet material which was unknown and unavailable previously.

Referring further to FIG. 3 and also to FIG. 4, the heat sealing forming machine 20 comprises an unwind roll 22 on which two of the heat-sealable films of interest are wound. The two polyethylene films 24 and 26 are unwound from the roller 20 over spaced upper and lower idler rollers 28 and 30 and into two successive pairs 31 and 32 of heat sealing rolls. The rolls 32 and 34 of the first pair 31 have mating, transverse heated lands 36 thereon separated by grooves 37. A pneumatic manifold 38 supplies air under pressure to outlet tubes 42 which are inserted through the groove regions 37 formed by the rolls 32, 34 and extend to the exit side of the rolls. The rolls 44 and 46 of the second pair 41 have mating longitudinal heated lands 48 separated by longitudinal grooves 49.

Referring further to FIGS. 3 and 4, in operation, the polyethylene films 24 and 26 are unwound together from the roll 22 (or are supplied from separate unwind rolls), and pass over the respective idler rolls 28 and 30 into the nip between the first rolls 32 and 34. There, the transverse heating lands 36—36 seal the moving films 24, 26 together along sealing lines 40—40 which are parallel to the longitudinal direction of movement of the films (see FIGS. 2 and 4), while the air tubes 42—42 inflate the longitudinal film regions 43—43 formed between the seals 40—40. The longitudinally joined films 24, 26 then enter the nip of the second pair of rolls 44 and 46, where the longitudinal lands 48 seal the films 24, 26 along lines 50—50 which are transverse to the direction of movement and transverse to the direction of the first seals 40—40 (see FIGS. 2 and 4). This completes the rectangular/square sealing pattern of the cushioning sheet 15, FIG. 2, and traps air within the individual grids of the pattern, thereby forming the rectangular/square sealed inflated areas or bubbles 16.

The problems associated with the use of industry standard films in the heat sealing machine 20 are illustrated by our attempts to make rectangular bubble cushion sheet from low density polyethylene as well as from high density polyethylene films. The formability of the low density polyethylene was not good. It was difficult to feed films less than one mil thick into the machine 20 because the films were very limp and sensitive to the heat of the sealing rollers. Making square bubbles of the low density film required a film thickness of at least one mil. The resulting bubbles had very little strength, and could easily be broken and squeezed flat due to imperfect sealing. Conversely, rectangular bubbles were relatively easily formed using the high density polyethylene film. However, while it was difficult to break the bubbles formed in the HDPE films, due to imperfect sealing they could be collapsed readily by squeezing the sheet.

The preferred material used in the films 24 and 26 has a selected cross-sectional profile of single or, most preferably, multiple extrusion polyethylene material 17, FIGS. 5A–5C, comprising a selected combination of density and molecular weight, alone or in combination with additives such as elastomeric modifiers which enhance sealability and other performance characteristics.

Two examples of suitable elastomeric modifier additives are the pelletized thermal plastic elastomer alloy designated PA-23 and PA-30 available from Exxon Chemical Company. The PA-23 elastomeric modifier can be dry blended with polyolefin plastics to improve processability, broaden heat seal range and increase the toughness and flexibility. PA-30 can be added to polypropylene or high density polyethylene to enhance impact strength, enhance heat sealing over a stated temperature range of freezing to 250° F. and provide good moisture barrier property.

In one presently preferred embodiment, shown in FIG. 5A, each of the films 24 and 26 is a tri-extrusion composite 17 comprising an outer-middle-outer thickness cross-section profile of the type ABA, where the outer film regions A are selected from high density polyethylene and high molecular weight medium density polyethylene, and the inner/middle film region B is linear low density polyethylene. The ABA film configuration preferably comprises a middle region of linear low density polyethylene polymer material sandwiched between top and bottom regions of high molecular weight medium density polyethylene polymer material (which has the same characteristics as high molecular weight, high density polyethylene polymer material). To our knowledge, this material was developed originally by Ultra-Tech Plastics, Inc., Mansfield, Ohio, but the surprisingly ideal adaptability of this material to the rectangular bubble forming process illustrated in FIG. 4 was not known previously. The cushioning sheet 15 formed as the result of joining the two tri-extrusion ABA films has the thickness cross-sectional profile ABA:ABA. Please note, the inner/facing A regions are joined or fused by the heat sealing process so that the joined profile of sheet 15 is ABABA. See FIG. 6A.

This tri-extrusion composite 17 does not constitute three separate films or layers. Rather, it is an integral single film structure which is readily formed by tri-extrusion of MDPE and LLDPE into the three alternating ABA regions of, preferably, MDPE, LLDPE and MDPE shown in FIG. 5. This material is not tacky, has provided surprisingly excellent sealability over the broad temperature range 220°–280° F., and has excellent stretchability, flexibility, strength and gas barrier characteristics. Using this composite three-layer MDPE/LLDPE/MDPE film 17, the square-bubble cushioning and packaging sheet material 15 formed by the heat-forming machine 20 of FIG. 3 satisfies all of the critical criteria relating to manufacturing and film quality. In fact, bubble cushion sheets formed of one-half mil thick films of this tri-extruded material approach the barrier performance of low density polyethylene/nylon/low density polyethylene barrier sheets of one mil thickness, and at lower cost.

While we do not know with certainty which of the film regions is responsible for specific properties, it is believed that the linear low density middle region provides laminating compatibility with the two medium density high molecular weight outer regions, and mitigates the stiffness of the medium density regions. The medium density regions are thought to provide the stretchability, strength and gas barrier characteristics of high density polyethylene materials as well as the excellent sealing characteristics.

Referring further to FIG. 5A, alternatively, the tri-extrusion ABA composite material 17 used in the films 24,26 can comprise an inner region of linear low density polyethylene surrounded by outer regions of high density polyethylene.

Also, as shown in FIG. 5B, the tri-extrusion films 17 can be of the type AAB, where A is high polyethylene, B is linear low density polyethylene and the sheet 15 is joined along the linear low density regions of the two films 24,26 to take advantage of the outstanding thermo-compression sealing qualities of the LLDPE material. The resulting sheet structure 15 is AAB:BAA and, specifically, the joined structure is AABAA. See FIG. 6B.

FIG. 5C depicts another alternative, tri-extrusion film 17, type ABC. Here, the A region is high density polyethylene, the B region is medium density polyethylene and the C region is linear low density polyethylene. The sheet 15 is joined along the facing inner linear low density regions to facilitate sealing, and consequently the associated sheet structure 15 is ABC:CBA and, after joinder, ABCBA. See FIG. 6B.

Having thus described preferred and alternative embodiments of my rectangular bubble cushioning and packaging sheet, the preferred material for the sheet, and the preferred method of manufacturing the bubble cushioning sheet, it will appreciated that those of usual skill in the art will readily use the teachings here to develop modifications which are within the scope of the invention as described and claimed.

What is claimed is:

1. In a flexible cushioning sheet comprising a pair of thin films joined together to define a plurality of sealed gas bubbles therebetween, the improvement wherein each film has a thickness profile ABA where B is linear low density polyethylene, A is selected from medium density polyethylene and high density polyethylene, and the sheet has a thickness profile ABABA.

2. The sheet of claim 1, wherein each film consists of an inner region of linear low density polyethylene surrounded by outer regions of high molecular weight medium density polyethylene.

3. The sheet of claim 1, wherein each film consists of an interior region of linear low density polyethylene and outer regions of high density polyethylene.

4. The cushioning sheet of claim 1 wherein the bubbles are generally rectangular in the plane of the sheet.

5. The cushioning sheet of claim 1 manufactured by the steps of passing the films together between a first pair of sealing rollers having heated lands thereon for sealing the films together along a plurality of generally parallel lines, injecting air between the films to form inflated regions between the generally parallel lines, and thereafter passing the films between a second pair of rollers having heated lands thereon for sealing the films together along lines which intersect the generally parallel lines.

6. In a flexible cushioning sheet comprising a pair of thin films joined together to define a plurality of sealed gas bubbles therebetween, the improvement wherein each film has a thickness profile AAB, where A is high density polyethylene, B is linear low density polyethylene, and the sheet has a thickness profile AABAA.

7. The cushioning sheet of claim 6 wherein the bubbles are generally rectangular in the plane of the sheet.

8. The cushioning sheet of claim 6 manufactured by the steps of passing the films together between a first pair of sealing rollers having heated lands thereon for sealing the films together along a plurality of generally parallel lines, injecting air between the films to form inflated regions between the generally parallel lines, and thereafter passing the films between a second pair of rollers having heated lands thereon for sealing the films together along lines which intersect the generally parallel lines.

9. In a flexible cushioning sheet comprising a pair of thin films joined together to define a plurality of sealed gas bubbles therebetween, the improvement wherein each film has a thickness profile ABC, where A is high density polyethylene, B is medium density polyethylene, C is linear low density polyethylene, and the sheet has thickness profile ABCBA.

10. The cushioning sheet of claim 9 wherein the bubbles are generally rectangular in the plane of the sheet.

11. The cushioning sheet of claim 9 manufactured by the steps of passing the films together between a first pair of sealing rollers having heated lands thereon for sealing the films together along a plurality of generally parallel lines, injecting air between the films to form inflated regions between the generally parallel lines, and thereafter passing the films between a second pair of rollers having heated lands thereon for sealing the films together along lines which intersect the generally parallel lines.

* * * * *